April 4, 1961   J. PFAU   2,978,616
ELECTRODE HOLDER FOR ELECTROEROSION MACHINES
Filed Feb. 20, 1958
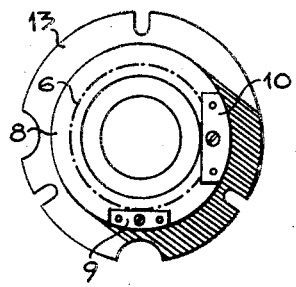
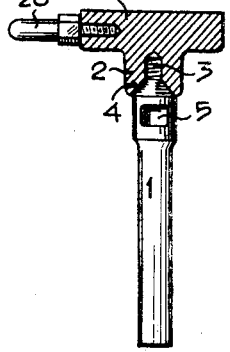
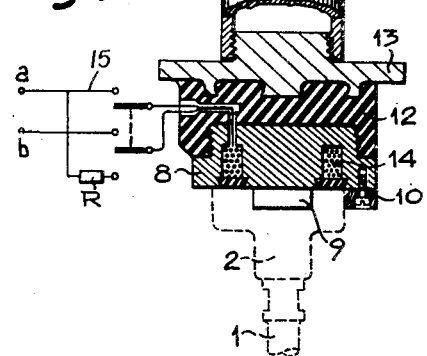
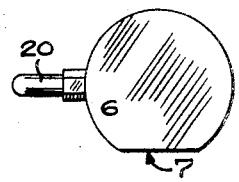
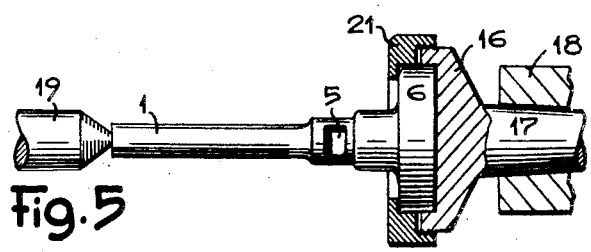

United States Patent Office 2,978,616
Patented Apr. 4, 1961

2,978,616

ELECTRODE HOLDER FOR ELECTROEROSION MACHINES

Jean Pfau, Geneva, Switzerland, assignor to Ateliers des Charmilles S.A., Geneva, Switzerland, a corporation of Switzerland Filed Feb. 20, 1958, Ser. No. 716,434

Claims priority, application Switzerland Feb. 20, 1957

4 Claims. (Cl. 317—163)

In machines for electrical machining, which are also known as electro-erosion machines, the removal of the metal from the part to be machined is effected by means of spark discharges, in a dielectric medium, between said part and an electrode which has the shape of the recess which it is desired to obtain in the part to be machined. However, the sparks remove metal not only from the part to be machined, but also from the electrode, so that the shape of the latter is modified during the course of the machining operation. It is consequently necessary to interrupt the machining from time to time and to remove the electrode, either for machining it and restoring it to its original shape, or for replacing it by another new electrode identical with the first. As the electrodes are generally of a soft metal, most generally of copper, it is difficult to avoid deformations of the electrode at the moment at which this is secured to the machine, which renders it practically impossible to remove an electrode and subsequently to replace it in the same position. This always results in a lack of precision in the operation carried out.

The present invention has for its object to remedy these disadvantages. It has for its subject an electrode and a device for securing it to a machine for electrical machining. According to the invention the electrode is provided with a part of soft metal, adapted for the electric machining of a part, said part being secured rigidly to a securing part of ferro-magnetic material, said part having at least one surface adapted to be applied on a surface having a shape substantially corresponding to the fixing device, said latter comprising a portion of ferro-magnetic material and means for creating a magnetic field for ensuring the fixing of the electrode to the said device by magnetization, the bearing surface between the electrode and the fixing device being shaped in such a manner as to allow of the securing of the electrode in a well defined single position relatively to the fixing device.

The invention also has for its subject a method of manufacture of an electrode, according to which the part is moulded in soft metal, it being then secured rigidly to the part of ferro-magnetic material, and the electrode is secured to a machine tool, by means of the part of magnetic material, so as to impart its definite shape thereto.

One form of construction of the subject of the invention is shown diagrammatically and by way of example in the accompanying drawings, wherein:

Fig. 1 is a side view of an electrode partly in section.

Fig. 2 is a plan view of said electrode.

Fig. 3 shows in section a form of construction of a fixing device.

Fig. 4 is a view of the lower face of the device in Fig. 3.

Fig. 5 shows an electrode secured to a machine enabling it to be machined.

The electrode shown in Fig. 1 has a part 1 of soft metal, for example copper, which is adapted for the electric machining of a part. Said part 1 is secured rigidly to a part 2 of hardened steel, by means of a threaded part 3 and a conical part or chuck 4. The part 1 has two flats 5 enabling it to be screwed forcibly into the part 2. The top of said latter is in the form of a disc 6, of which the periphery is provided with a lateral flat 7. Said periphery also carries a current terminal 20 enabling the necessary tension to be applied to the electrode for producing discharges in the form of sparks. The upper face of said disc 6, which is opposed to the face to which the part 1 of soft metal is secured, is adapted to be applied against a corresponding bearing surface of the securing device shown in Figs. 3 and 4.

Said securing device comprises a part or chuck 8 of ferro-magnetic material, of strong remanence, of which the lower face is ground and serves as a bearing surface for the upper face of the disc 6 of the electrode, which is also ground. Said part 8 has a stop 9 and a projecting part 10 which has a plane surface serving as a bearing for the flat 7 of the disc 6. Said part 10 and the stop 9 are adapted to cooperate with the disc 6 for determining its position relatively to the fixing device.

All the bearing surfaces of the disc 6 and of the fixing device have a shape enabling them to be cleaned easily, for example with a rag. This is very important as during the course of machining projections of polluted dielectric liquid are always produced which give rise to deposits which often render difficult to secure the electrode by means of known fixing devices, particularly when the electrode is simply engaged in a cylindrical bore. In the device described, it is very easy to maintain the bearing surfaces in a perfectly clean condition, thus enabling a great precision in fixing the electrode to be obtained.

The part 8 of the fixing device is secured to the end of a tube 11 through the medium of a body 12 of insulating material and a plate 13 which is secured to the end of the tube 11. The latter is adapted to slide without clearance in a part of the machining machine so as to permit of the advance of the electrode in proportion to the machining. The lower face of the plate 13 has ribs which are embedded in the body 12, for ensuring its fixing, whilst the said body and the part 8 are secured together by screwing. The part 8 is provided with a groove in which is located a winding 14 of which the ingoing wires pass through a bore of the body 12. Said winding 14 is connected by a double switch 15 to a source of direct current of which the terminals $a$ and $b$ are shown in the drawing. As will be seen one position of said switch 15 enables the winding 14 to be connected directly to the terminals $a$ and $b$, whilst its other position permits of obtaining a reversal of current in said winding and at the same time a reduction of said current by reason of a resistance R which is arranged in series with the said winding.

The electrode shown in Fig. 1 may easily be placed in a single position well determined relatively to the fixing device according to Fig. 3. It suffices, in fact, to apply the disc 6 against the lower face of the part 8 to set its flat 7 against the projecting part 10 and then to move the electrode until the periphery of the disc 6 comes into contact with the stop 9. For fixing the electrode, it suffices to act on the switch 15 so as to branch the winding 14 directly on the terminals $a$ and $b$ of the source of current and thus create a magnetic field which is closed in passing by the disc 6, whereby the latter is strongly attracted against the part 8. The switch 15 may then be released and returns to its position of rest shown in the drawing, as the disc 6 and the part 8 are of hardened steel which has a strong remanence. The remanent excitation is then sufficient for ensuring the fixing of the electrode as the latter is not subjected to any mechanical effort during machining. When it is desired to remove the electrode, it suffices to act on the switch 15 so as to branch the winding 14 in series with the resistance R on the terminals a and b, in such a manner that this winding is traversed by a much weaker current of opposite direction relatively to that which has been used for creating a residual magnetic field. The value of the resistance R is selected in such a manner as to impart to the current the value which is necessary for annulling the magnetic field. The value of this resistance is not critical as in practice it is not necessary to annul completely the residual magnetic field, and a partial diminution of this latter may suffice to enable the electrode to be removed without difficulty.

As will be seen the placing in position and removal of the electrode are effected without it being necessary to apply any force on said latter, which obviates any deformation of the electrode which could be prejudicial to the precision of the machining.

Further, it is very easy to produce a number of electrodes rigorously similar. It suffices, in fact, to have a number of identical parts 2, which allows a portion of soft metal to each of said parts 2. The part of soft metal, which should have a shape corresponding with that which it is desired to obtain in the part to be machined, may advantageously be rough shaped before being secured to a part 2. Thereupon, the electrode is secured to a machine tool, for example by means of a part 16 and a threaded ring 21 which are shown in Fig. 5. Said part 16 has a recess of which the shape corresponds exactly with that of the disc 6. Its other face is extended by a Morse cone 17, that is to say by a cone of which the angle at the vertex is sufficiently small so that part remains fixed solidly in the interior of another part 18, when the cone 17 is forced into a conical recess of the part 18. Said latter may, for example, constitute the mandrel of a lathe, which is also provided with a centre point 19 bearing against the part 1 of the electrode. The electrode being thus secured to the machine tool, its machining is completed and its definite shape is imparted thereto.

For removing the electrode, it suffices to withdraw the centre point 19 and to disengage the disc 6 from the corresponding recess of the part 16 after having unscrewed the screwed ring 21. The other electrodes can then be placed successively on the machine, and as there is only one possible position between the disc 6 and the part 16, it is easy to obtain a whole series of electrodes which are exactly similar to one another and directed in the same manner relatively to their disc 6. It is thus possible to replace on the electro-erosion machine a used electrode by a new one which is located exactly in the same position as that which has been removed. Further, it is also possible to interrupt an operation in action for effecting a more urgent one and then to resume the first operation. It will be understood that it is necessary to indicate very exactly the position of the part of which the machining is to be interrupted in order to make it possible, when the urgent operation has been effected, to replace it in an identical position on its support, which can be effected easily by means of known devices. The electrode which was used for the first operation is then replaced in position and it is possible to resume the interrupted operation without having to make other adjustments.

It is also possible, for other reasons, to provide a lens, or a microscope, secured to a part 2 of ferromagnetic material, and capable of being secured to the machine in the same manner as an electrode, said lens enabling a very precise view to be taken of the part to be machined and thus an exact adjustment of the electrode support assembly of the machine relatively to the part to be machined.

It will be understood that it is possible to provide numerous modifications of construction and that, for example, it is possible to maintain the current in the winding 14 as long as the electrode is to remain fixed to the machine. In this case it is possible to use materials which do not have a high remanence, so that it suffices to cut off the excitation of the winding 14 so as to enable the electrode to be removed from the machine without difficulty. Further, in the form of construction shown, only one of the parts 2 and 8 may be of ferro-magnetic material so as to ensure the maintenance of the electrode in position by remanent magnetization.

I claim:
1. A magnetic chuck suitable for holding the electrode of an electroerosion machine, said chuck comprising two substantially circular discs of ferromagnetic material having flat end faces contacting each other, one of said discs being movable in the unmagnetized state and having the form of a major segment of a circle, the other disc being stationary and having a projection overlapping said movable disc along the plane portion of the periphery of said segment in contact therewith, a second projection on said stationary disc limiting the movement of said movable disc along said overlapping projection and defining the assembled position of the discs, said movable disc adapted to support said electrode, and means creating a magnetic field holding said two discs in assembled position.

2. A holding device suitable for securing an electrode of an electroerosion machine in an accurately fixed position comprising in combination, first and second chucks of ferromagnetic material having respective first and second flat end faces contacting each other, said second chuck adapted to support said electrode and being movable in the unmagnetized state and having projections provided with accurately determined peripheral bearing surfaces extending toward said first chuck, projections on said first chuck overlapping said second chuck and having respective surfaces bearing against said peripheral bearing surfaces of said second chuck, thereby defining the assembled position of said holding device, and means creating a magnetic field holding said two chucks in assembled position.

3. The holding device as defined in claim 2 wherein one of said chucks is comprised of a material having a high remanence, said means creating a momentary magnetic field for magnetizing said material whereby said second chuck is secured to said first chuck and second means for producing a partial reduction of the remanent magnetic field so that said second chuck may be removed.

4. An electrode holding device according to claim 1, including a winding, a source of direct current and an electric circuit, said electric circuit serving to pass current into said winding for creating a magnetic field, said circuit also serving to pass a much weaker current in the opposite direction to said first current so as to produce a desired diminution of said magnetic field.

References Cited in the file of this patent
UNITED STATES PATENTS

| | | |
|---|---|---|
| 1,523,771 | Hanson | Jan. 20, 1925 |
| 2,110,832 | Hogg et al. | Mar. 8, 1938 |
| 2,485,361 | Condit et al. | Oct. 18, 1949 |
| 2,501,954 | McKechnie et al. | Mar. 28, 1950 |